US012602452B2

(12) United States Patent
Ip et al.

(10) Patent No.: US 12,602,452 B2
(45) Date of Patent: Apr. 14, 2026

(54) FILTERING OF DYNAMIC OBJECTS FROM VEHICLE GENERATED MAP

(71) Applicants: Julien Ip, Royal Oak, MI (US); Eduardo Jose Ramirez Llanos, Rochester, MI (US); Matthew Donald Berkemeier, Beverly Hills, MI (US)

(72) Inventors: Julien Ip, Royal Oak, MI (US); Eduardo Jose Ramirez Llanos, Rochester, MI (US); Matthew Donald Berkemeier, Beverly Hills, MI (US)

(73) Assignee: AUMOVIO Autonomous Mobility US, LLC, Auburn Hills, MI (US)

( * ) Notice: Subject to any disclaimer, the term of this patent is extended or adjusted under 35 U.S.C. 154(b) by 0 days.

(21) Appl. No.: 17/645,620

(22) Filed: Dec. 22, 2021

(65) Prior Publication Data

US 2023/0195854 A1 Jun. 22, 2023

(51) Int. Cl.
*G06F 18/25* (2023.01)
*B60W 60/00* (2020.01)
(Continued)

(52) U.S. Cl.
CPC ......... *G06F 18/251* (2023.01); *B60W 60/001* (2020.02); *G01C 21/3807* (2020.08);
(Continued)

(58) Field of Classification Search
CPC .............. G06F 18/251; B60W 60/001; B60W 2420/42; B60W 2420/52;
(Continued)

(56) References Cited

U.S. PATENT DOCUMENTS 9,255,988 B2 * 2/2016 Zeng .................... G01S 13/9029
10,775,481 B1 * 9/2020 Puglielli ................. G01S 7/288
(Continued)

FOREIGN PATENT DOCUMENTS

CN 113012210 A 6/2021
JP 2019529209 A 10/2019

OTHER PUBLICATIONS

The International Search Report and the Written Opinion of the International Searching Authority mailed on Apr. 28, 2023 for the counterpart PCT Application No. PCT/US2022/082195.
(Continued)

*Primary Examiner* — Kenny Nguyen

(57) ABSTRACT

A method and system for a vehicle control system generates maps utilized for charting a path of a vehicle through an environment. The method performed by the system obtains information indicative of vehicle movement from at least one vehicle system and images including objects within an environment from a camera mounted on the vehicle. The system uses the gathered information and images to create a depth map of the environment. The system also generates an image point cloud map from images taken with a vehicle camera and a radar point cloud map with velocity information from a radar sensor mounted on the vehicle. The depth map and the point cloud maps are fused together and any dynamic objects filtered out from the final map used for operation of the vehicle.

14 Claims, 7 Drawing Sheets

(51) Int. Cl.

| | |
|---|---|
| *G01C 21/00* | (2006.01) |
| *G01S 13/86* | (2006.01) |
| *G01S 13/89* | (2006.01) |
| *G06T 7/55* | (2017.01) |
| *G06T 7/70* | (2017.01) |
| *G06V 20/58* | (2022.01) |

(52) U.S. Cl.
CPC ............ *G01S 13/867* (2013.01); *G01S 13/89* (2013.01); *G06T 7/55* (2017.01); *G06T 7/70* (2017.01); *G06V 20/58* (2022.01); *B60W 2420/403* (2013.01); *B60W 2420/408* (2024.01); *B60W 2554/404* (2020.02); *B60W 2556/50* (2020.02); *G06T 2207/10028* (2013.01); *G06T 2207/30244* (2013.01); *G06T 2207/30264* (2013.01)

(58) Field of Classification Search
CPC ........ B60W 2554/404; B60W 2556/50; G01C 21/3807; G01C 21/1652; G01C 21/1656; G01C 21/30; G01C 21/3602; G01C 21/3833; G01S 13/867; G01S 13/89; G01S 2013/932; G01S 13/582; G01S 13/584; G01S 13/931; G06T 7/55; G06T 7/70; G06T 2207/10028; G06T 2207/30244; G06T 2207/30264; G06T 2200/08; G06T 2207/30241; G06T 7/579; G06V 20/58

See application file for complete search history.

(56) References Cited

U.S. PATENT DOCUMENTS

| | | | | |
|---|---|---|---|---|
| 2013/0257864 | A1* | 10/2013 | Neuman | H04N 13/363 |
| | | | | 345/419 |
| 2017/0299714 | A1 | 10/2017 | Rohani | |
| 2021/0063200 | A1* | 3/2021 | Kroepfl | G01C 21/387 |
| 2021/0078600 | A1* | 3/2021 | Price | G01C 21/3407 |
| 2021/0122364 | A1* | 4/2021 | Lee | G08G 1/166 |
| 2021/0141092 | A1 | 5/2021 | Chen | |
| 2021/0149408 | A1* | 5/2021 | Dodson | G05D 1/0221 |
| 2021/0165093 | A1* | 6/2021 | Komorkiewicz | G06V 10/80 |
| 2022/0215565 | A1* | 7/2022 | Jiang | G06T 7/50 |
| 2022/0383462 | A1* | 12/2022 | Yin | G06T 5/50 |
| 2023/0142863 | A1* | 5/2023 | Fan | G06N 3/0475 |
| | | | | 706/25 |

OTHER PUBLICATIONS

Steinb.Aeck Josef et al., "Active—1-20 Autonomous Car to Infrastructure Communication Mastering Adverse Environments", 2019 Sensor Data Fusion: Trends, Solutions, Applications (SDF), IEEE, Oct. 15, 2019 (Oct. 15, 2019), pp. 1-6, XP033667146, DOI: 10.1109/SDF.2019.8916631.

Steinb.Aeck Josef et al., "Occupancy Grid Fusion of Low-Level Radar and Time-of-Flight Sensor Data", 2019 22nd Euromicro Conference on Digital System Design (DSD), IEEE, Aug. 28, 2019 (Aug. 28, 2019), pp. 200-205, XP033637566, DOI: 10.1109/DSD.2019.00038.

Notice of Reasons for Refusal mailed on Jul. 2, 2025 for the counterpart Japanese Patent Application No. 2024 559111 and machine translation of same.

* cited by examiner

FILTERING OF DYNAMIC OBJECTS FROM VEHICLE GENERATED MAP

TECHNICAL FIELD

The present disclosure relates to method and system for removing dynamic objects from a map utilized for autonomous navigation of a vehicle.

BACKGROUND

Autonomously operated or assisted vehicles utilize a map of the environment surrounding the vehicle to define a vehicle path. Generation of the map may utilize information from sensor systems onboard the vehicle. The sensor systems may capture moving objects that can appear in the final map as static features. Identification and removal of moving objects from the map is therefore desirable to obtain accurate maps. Automotive suppliers and manufactures continually seek improved vehicle efficiencies and capabilities.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of creating a map of an environment surrounding a vehicle according to a disclosed exemplary embodiment includes, among other possible things, the steps of obtaining information indicative of vehicle movement from at least one vehicle system, obtaining images including objects within an environment from a camera mounted on the vehicle, creating a depth map of the environment based on images obtained from the camera, creating an image point cloud map of the environment based on the images obtained from the camera, creating a radar point cloud map of object velocities with information from a radar sensor mounted on the vehicle and the information indicative of vehicle movement, and creating a fused map by combining the image point cloud map with the radar point cloud map and removing any dynamic objects.

Another exemplary embodiment of the foregoing method further comprises creating a occupancy grid of the image point cloud map and a occupancy grid of the radar point cloud map.

Another exemplary embodiment of any of the foregoing methods further comprises identifying an object as a dynamic object in response to a cluster of points within the radar point cloud map having a velocity that indicates movement relative to static features within the environment.

Another exemplary embodiment of any of the foregoing methods further comprises determining a pose of the camera in a local reference frame.

Another exemplary embodiment of any of the foregoing methods further comprises using the pose of the camera in the creation of the depth map.

Another exemplary embodiment of any of the foregoing methods further comprises using the pose of the camera in the creation of the point cloud map.

In another exemplary embodiment of any of the foregoing methods, the depth map includes points that are indicative of a distance between the vehicle and objects surrounding the vehicle.

Another exemplary embodiment of any of the foregoing methods further comprises communicating the fused map to a vehicle driving control system.

In another exemplary embodiment of any of the foregoing methods, the object velocities comprise a Doppler velocity.

In another exemplary embodiment of any of the foregoing methods, the vehicle system comprises at least one of a navigation system, a wheel speed sensor, an acceleration sensor, an inertial measurement unit and a global positioning system.

In another exemplary embodiment of any of the foregoing methods, the information indicative of vehicle movement is generated with a vehicle dynamic model.

In another exemplary embodiment of any of the foregoing methods, the camera comprises a mono-camera.

An autonomous vehicle system for creating a map of static objects within an environment surrounding the autonomous vehicle, the system according to another exemplary embodiment includes, among other possible things, a controller configured to obtain images of objects from a camera mounted on the vehicle, create a depth map of the environment based on images obtained from the camera, create an image point cloud map of the environment based on the images obtained from the camera, and create a point cloud map of object velocities with information from a radar sensor mounted on the vehicle and the information indicative of vehicle movement and create a fused map by combining the depth map with the point cloud map and removing any dynamic objects.

In another embodiment of the foregoing autonomous vehicle system, the controller is further configured to create a occupancy grid of the image point cloud map and occupancy grid of the radar point cloud map.

In another embodiment of any of the foregoing autonomous vehicle system, the controller is further configured to identify an object as a dynamic object in response to a cluster of points within the radar point cloud map having a velocity that indicates movement relative to static features within the environment.

Another embodiment of any of the foregoing autonomous vehicle systems further includes a data storage medium that includes instructions executable by the controller.

Another embodiment of any of the foregoing autonomous vehicle systems further comprises at least one of a navigation system, a wheel speed sensor, an acceleration sensor, an inertial measurement unit and a global positioning system.

Another embodiment of any of the foregoing autonomous vehicle systems further comprises a mono-camera.

A computer readable medium according to another exemplary embodiment includes, among other possible things, instructions executable by a controller for creating a map of an environment surrounding a vehicle, the instructions include instructions prompting a controller to create a depth map of the environment based on images obtained from a camera, instructions prompting a controller to create an image point cloud map based on images obtained from the camera, instructions prompting the controller to create a point cloud map of object velocities with information from a radar sensor and information indicative of vehicle movement, and instructions prompting the controller to create a fused map by combining the depth map with the point cloud map and removing any dynamic objects.

Another embodiment of the foregoing computer readable medium further includes instructions for prompting the controller to identify an object as a dynamic object in response to a cluster of points within the radar point cloud map having a velocity that indicates movement relative to static features within the environment.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
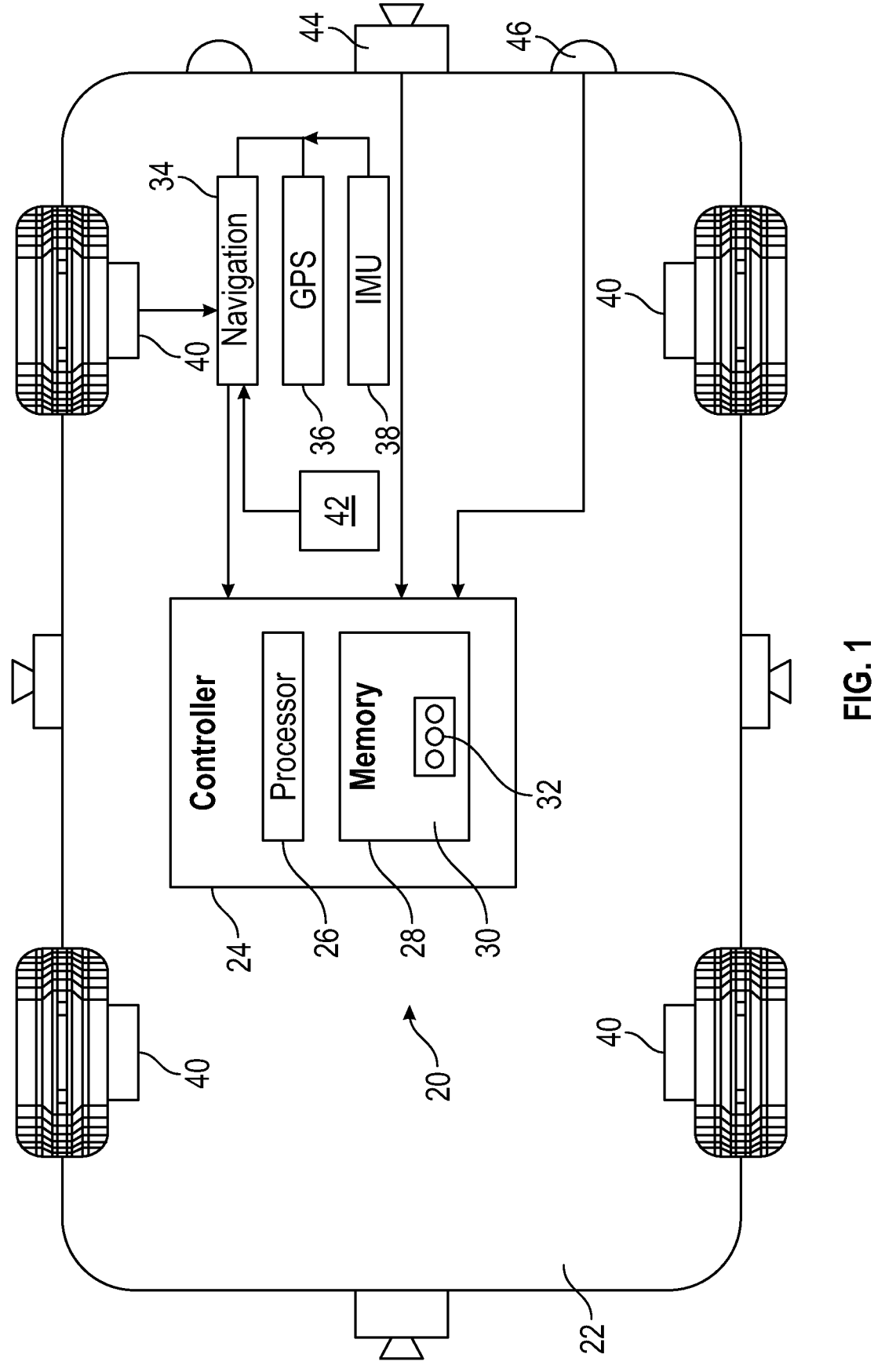
FIG. 1 is a schematic illustration of a vehicle including an example disclosed control system.

Referring to FIG. 1, a control system 20 is provided within a vehicle 22 for construction of a map utilized for creating and plotting a vehicle path. The example control system 20 includes features to remove dynamic elements that are not static parts of the environment to simplify and speed up generation of the map.

The example control system 20 is embodied in a controller 24 that includes a processor 26 and a memory device 28 that stores a plurality of software instructions 32. In one disclosed example, the memory device 28 includes a computer readable medium 30 that stores the software instructions 32.

The example controller 24 may be a separate controller dedicated to the control system 20 and may be part of an overall vehicle controller. Accordingly, example controller 24 relates to a device and system for performing necessary computing and/or calculation operations of the control system 20. The controller 24 may be specially constructed for operation of the control system 20, or it may comprise at least a general-purpose computer selectively activated or reconfigured by software instructions 32 stored in the memory device 28. The computing system can also consist of a network of (different) processors.

The example vehicle controller 24 includes the processor 26 and the memory device 28. The memory device 28 provides for the storage of the software instructions 32 that prompt operation of the controller 24. The software instructions 32 may be embodied in a computer program that uses data obtained from the sensor systems 34, 36 and 38 and data stored in the memory device 28 that may be required for its execution.

The instructions 32 for configuring and operating the controller 24 and control system 20 and the processor 26 are embodied in software instructions that may be stored on a computer readable medium. The computer readable medium may be embodied in structures such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. The disclosed computer readable medium may be a non-transitory medium such as those examples provided.

Moreover, the software instructions 32 may be saved in the memory device 28. The disclosed memory device 28, may can include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.). The software instructions 32 in the memory device 28 may include one or more separate programs, each of which includes an ordered listing of executable instructions for implementing logical functions. The disclosed controller 24 is configured to execute the software instructions 32 stored within the memory device 28, to communicate data to and from the memory device 28, and to generally control operations pursuant to the software. Software in memory, in whole or in part, is read by the processor 26, perhaps buffered within the processor, and then executed.

The example controller 24 receives information from various vehicle sensor systems. In one disclosed embodiment, the sensor systems include a navigation system 34, a global positioning system 36, an inertial measurement unit 38, an accelerometer 42 and wheel position sensor 40. The controller 24 also receives information from a camera system 44 and a radar system 46. In the disclosed example, the camera system 44 comprises four cameras disposed on each side of the vehicle 22. The radar system includes radar sensors disposed at various locations around the vehicle 22. It should be appreciated that the specific position of each of the cameras 44 and radars 46 are shown by way of example and that other positions and configurations are within the scope and contemplation of this disclosure. Moreover, in the disclosed example, each of the cameras 44 are mono-cameras. Accordingly, the example camera system 44 may include cameras disposed on other surfaces or in other orientations of the vehicle 22. Likewise, the radar system 46 may also include radar sensors disposed at various locations on the vehicle 22.

The information provided by the sensor systems 36, 38, 40 and accelerometer 42 is provided to the navigation system 34. The navigation system 34 may accumulate the information and generate a vehicle dynamic model 45 (FIG. 3) that is indicative of vehicle movement. The dynamic model 45 may be a separate algorithm executed by the controller 24 according to software instructions 32 saved in the memory device 28.

In this disclosed example, the vehicle 22 is an autonomously operable vehicle that may or may not require driver input to proceed along a desired path. The example control system 20 may be part of a completely autonomous system or may comprise a portion of a vehicle operation system with semiautonomous features.

Figure 2:
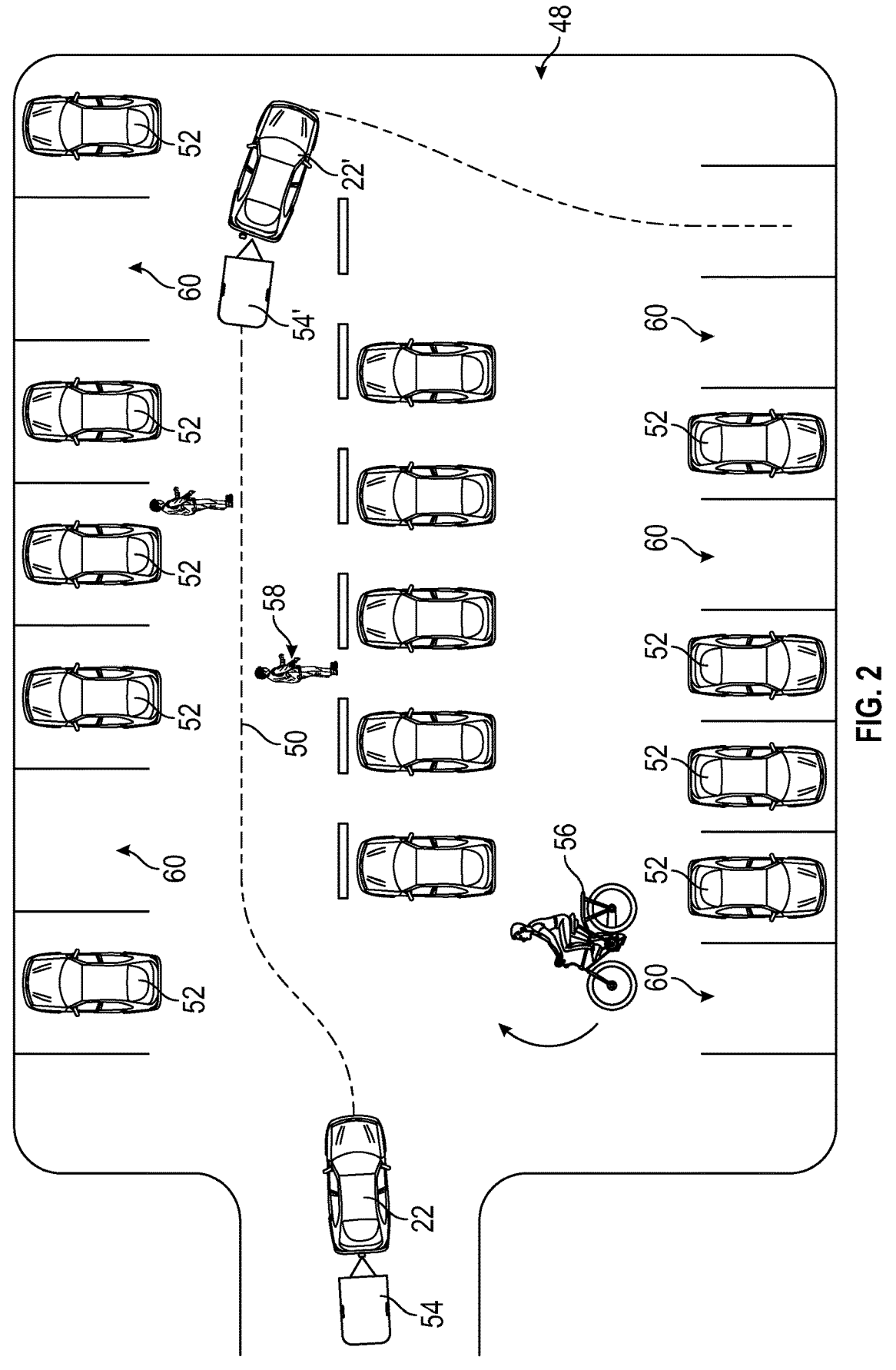
FIG. 2 is a schematic view of a parking lot with vehicles and open spaces.

Referring to FIG. 2, with continued reference to FIG. 1, during an autonomous operation of the vehicle 22, the various features and objects within an environment proximate that vehicle 22 must be accounted for and recognized in order to plan a reference path 50 that results in both efficient and collision-free operation of the vehicle 22. In one disclosed example embodiment, operation is shown as a path defined through a parking lot schematically shown and indicated at 48.

The parking lot 48 includes a plurality of parked vehicles 52 and empty spaces 60 randomly orientated and proximate the vehicle 22. In order for the vehicle 22 to plot the reference path 50, each of the objects within the parking lot 48 need to be recognized and defined on a map.

Operation of the vehicle 22 in an autonomous mode does not occur in a purely static environment. For example, the parking lot 48 includes a static feature that is represented by the parked vehicles 52 along with other parking structures and boundaries. However, within the parking lot 48 are moving pedestrians 58, motorcycle or bicycle riders 56, that all are sensed by the camera 44 and radar systems 46. Plotting of the path 50 need not consider these moving objects as they do not remain in the spot detected during initial determination. Of course, the presence and location of moving objects is detected during operation to avoid collisions. However, in the creation of a map, the dynamic features are not necessary and require additional processing resources.

The maps referred to in this example disclosure are not necessarily generated for viewing by a vehicle operator. Instead, each of the disclosed maps are generated for use by the control system 20 to provide for navigation of a vehicle through an environment autonomously and/or semi-autonomously. The maps are therefore generated to provide a means of organizing data associated with locations within an environment surrounding the vehicle 22. Moreover, each of the maps described in this disclosure describe an organization of information and relationships between the organized information indicative of the environment surrounding the vehicle.

Moreover, in some instances, when the vehicle 22 is pulling a trailer 54, the trailer 54 may appear in images and mistakenly regarded as a fixed object. As is schematically indicated by vehicle 22' pulling trailer 54', in a turning maneuver, the vehicle control system 20 may take an image of the trailer 54'. That image is incorporated into the map and with only the use of the images, may not discernible from a static object. Accordingly, the example system utilizes a combination of images from the camera system 44 and a radar point cloud map of velocities of the various objects detected within the environment with the radar system 46 to remove dynamic objects from the map.

Figure 3:
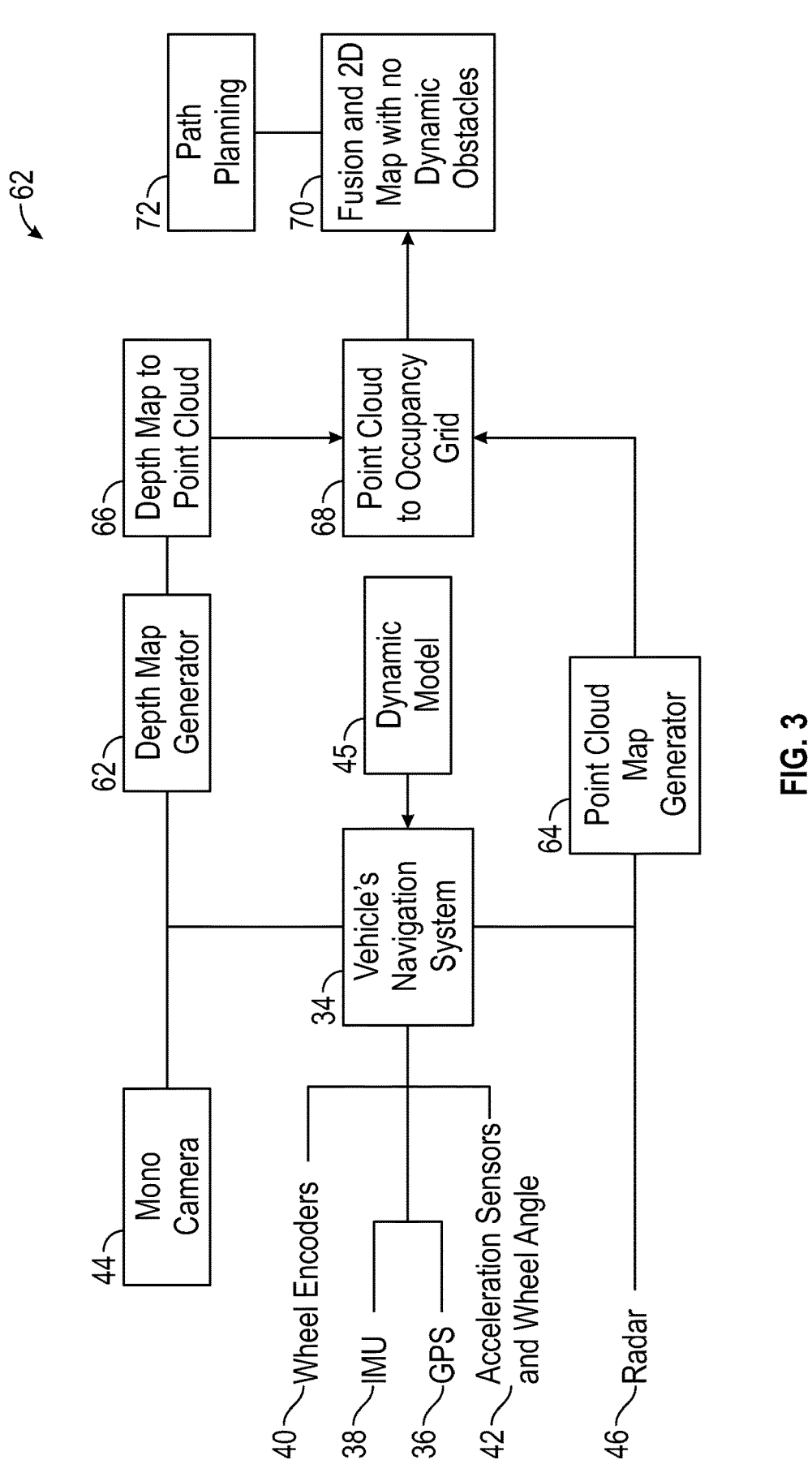
FIG. 3 is a flow diagram illustrating example method steps for generating a map for use by an autonomous vehicle control system.

Referring to FIG. 3, with continued reference to FIG. 1, a flow chart is schematically shown and indicated at 62 that illustrates processing steps performed by the system 20 according to one disclosed embodiment. The example control system 20 utilizes information obtained about vehicle motion along with images obtained from the camera system 44 and a radar point cloud map including information indicative of relative of velocities generated by the radar system 46. The radar point cloud map includes a plurality of points that are indicative of a relative velocity between the moving vehicle and objects around the vehicle. The vehicle will attain images of the environment surrounding the vehicle with the camera 44 and use a depth map generator as indicated at 62 to develop a depth map of the surrounding environment. A depth map is generated from the image by associating a distance to each pixel within the image. Each image frame contributes to the construction of a cloud of points representing a distance from a reference point. In this example, the reference point is the camera 44.

The information indicative of vehicle movement obtained from the sensor is utilized to determine a pose of the camera system 44. The pose of the camera system 44 is the orientation of the camera relative to the vehicle 22 and the environment. The position of the camera system 44 on the vehicle 22 is known and understood as it is fixed relative to the vehicle. The position of the camera 44 on the vehicle 22 therefore provides a specific orientation relative to objects in the environment known as pose. The pose of the camera system 44 is therefore determined for a local reference frame. The pose is then utilized in the creation of the depth map, an image point cloud map and a radar point cloud map.

Figures 4, 5:
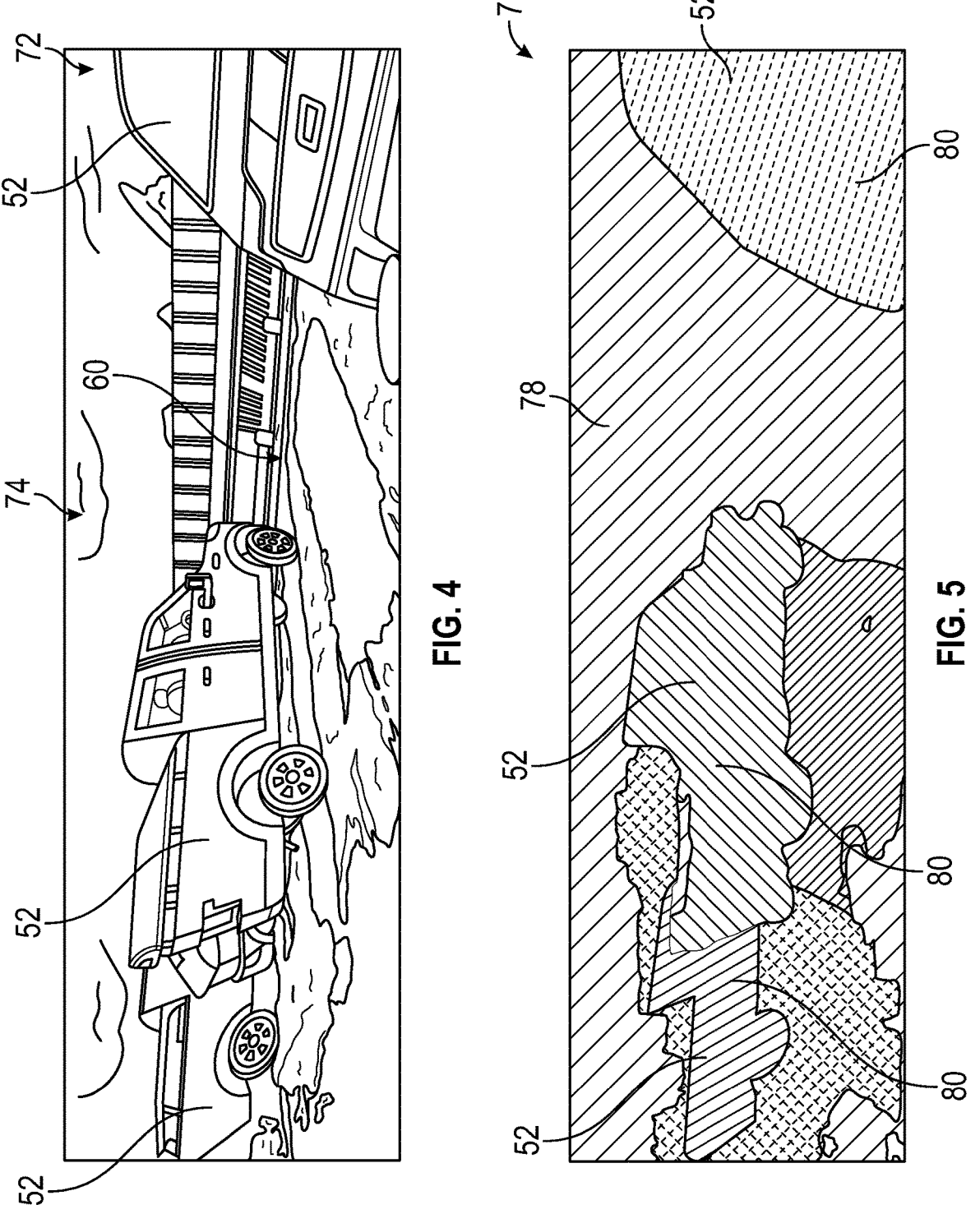
FIG. 4 is an image captured by a vehicle camera.
FIG. 5 is an example depth map constructed from the image captured by the vehicle camera.

Referring to FIGS. 4 and 5, with continued reference to FIG. 3, an example captured image 72 is shown and includes objects 52 and open spaces 60. A depth map 76 that corresponds with the image 72 is shown in FIG. 5. The depth map 76 includes a plurality of different shading of pixels. Each different shade of the pixels 80 and 78 represent a different distance relative to the vehicle 22 or some other decided upon reference point. In the example depth map 76, the darkest pixels 78 indicate the greatest distance. The greatest distance is indicated at 78 and in this example corresponds to the background indicated at 74 in the image 72. The other pixels are shades of gray and are indicative of static objects that are closer to the path and the vehicle. In this example, the static objects include the parked vehicles 52. Those parked vehicles 52 are represented by various shades of gray in the depth map 76 as is indicated at 80.

Figure 6:
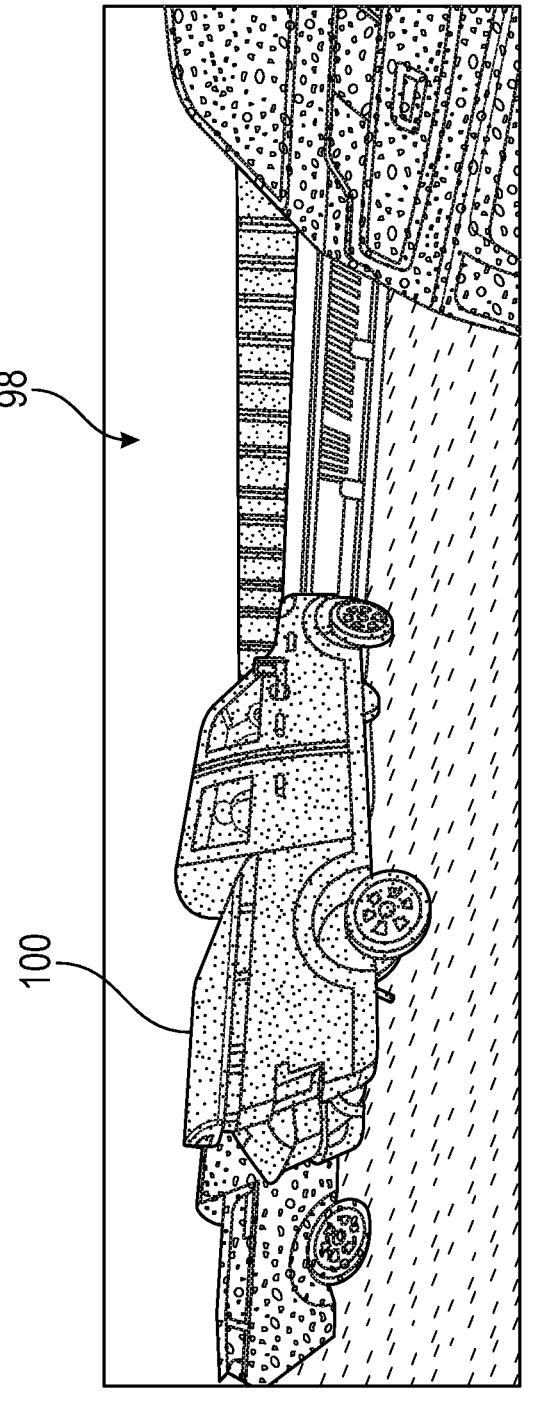
FIG. 6 is an example image point cloud map constructed from the image captured by the vehicle camera.

Referring to FIG. 6, with continued reference to FIGS. 1, 3 and 4, an image point cloud map, schematically indicated at 98, is created based on the image 72 and the depth map. The image point cloud map 98 includes a plurality of points that represent a distance and correspond to pixels within the image 72. The distance represented by each point is between the object and a reference point. The differing distances are represented by different shading. In one disclosed embodiment, the darker the shading, the further from the reference point is the point in the image point cloud map 98. A cluster of points 100 within the image point cloud map 98 may correspond to an object such as the vehicles 52 captured in the image 72.

Figures 7, 8:
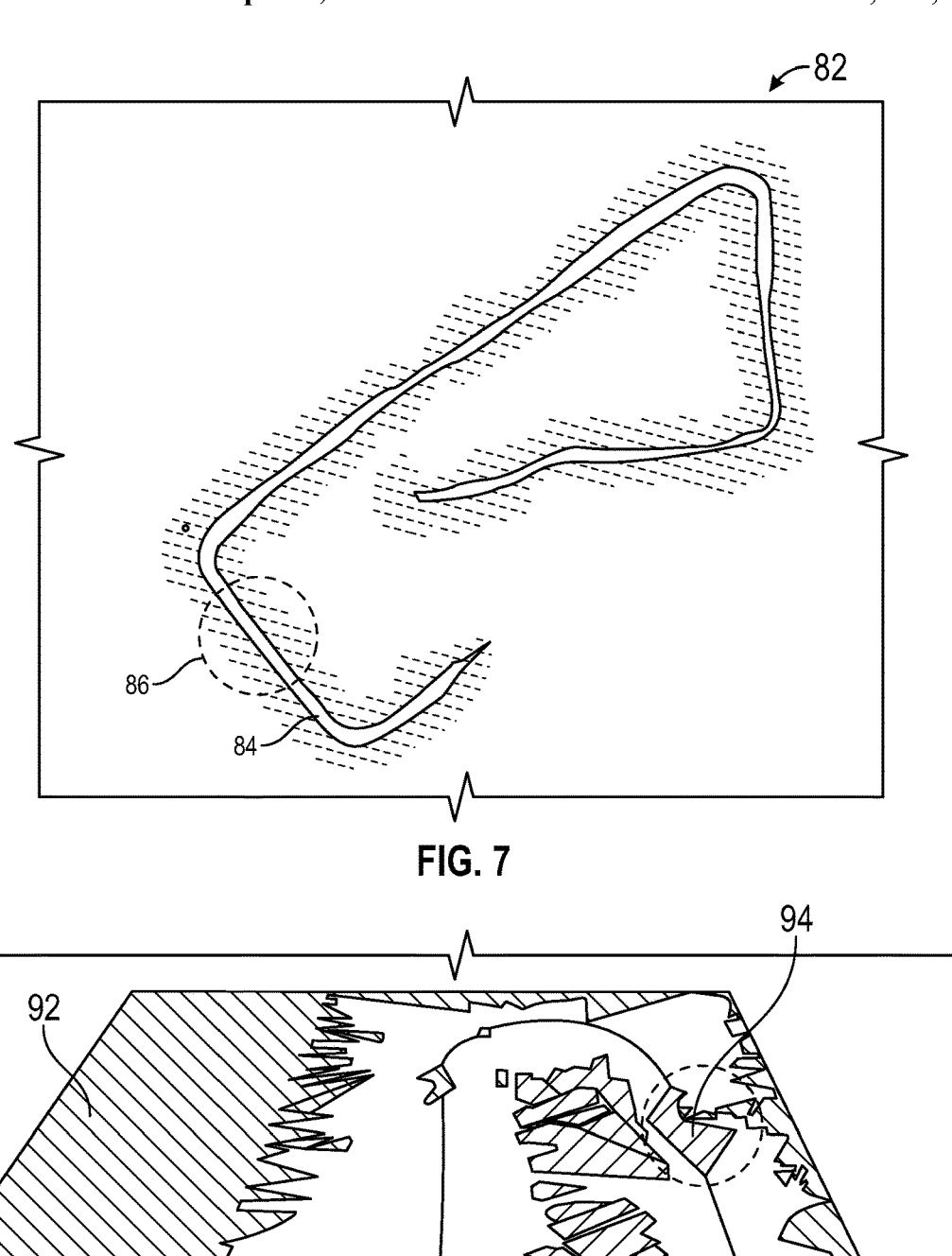
FIG. 7 is a schematic illustration of an example radar point cloud map of relative velocities.
FIG. 8 is a schematic view of an example occupancy grid map.

Referring to FIG. 7 with continued reference to FIGS. 1 and 3, concurrently with obtaining the images as shown in FIG. 4 and constructing the image point cloud 98, the control system 20 generates a radar point cloud map 82 with a point cloud map generator 64. An example radar point cloud map 82 is illustrated in FIG. 7. The radar point cloud map 82 is formed from a series of points 84 that each represent a relative velocity obtained from the radar system 46. The different velocities are indicated by different colors, shading, or other differences between each of the points and/or group of points 84. In this example, the radar point cloud map 82 is indicative of a Doppler velocity of objects relative to the vehicle 22. Accordingly, the radar point cloud map 82 provides for determining a difference between static structures and dynamic structures. Dynamic structures include moving objects such as pedestrians 58, bicycles 56, as well as the trailer 54' shown in FIG. 2. The radar point cloud map 82 shows each of these features as a group of points referred to as a cloud of relative velocities that provides for a determination of whether an object is static or dynamic. In this disclosed example, a cluster 86 within the radar point cloud 82 is indicative of a dynamic object and shows the points in a different manner to indicate that the velocities are greater than the other velocities shown within the point cloud map 82.

Once both a depth map 76 as shown in FIG. 5, the image point cloud map as shown in FIG. 6 and the radar point cloud map 82 of the velocities shown at FIG. 7 are generated, the system 20 creates occupancy grids as indicated at 68 in the flow chart 62. The occupancy grids convert the 3D images of the depth map 76, the image point cloud 98 and the radar point cloud map 82 into a two-dimensional images as indicated at 88 in FIG. 8 that are easier and more efficient to process.

It should be understood, that the depth map generator 62, the point cloud map generators 64, 66 and the occupancy grids are embodied in the controller 24 as software instructions that are performed by the processor 26. Each of these features may be embodied as algorithms or separate software programs accessed and performed by the processor 26. Moreover, the specific features and operation of the depth map generator 62, point cloud map generators 64, 66 and the occupancy grids 68 may include one of many different operations and programs as are understood and utilized by those skilled in the art.

Referring to FIG. 8, with continued reference to FIGS. 3-7, the example occupancy grid 88 is schematically shown and illustrates the static and dynamic objects that are found within both the depth map 76 and the point cloud maps 82, 98. As is shown in the schematic illustration of FIG. 8, open space 90 as well as objects 92 are represented by different shading. The objects 92 are shown as darker areas and are indicative of the static structures such as the parked vehicles as shown in FIG. 2. In the example occupancy grid 88, a dynamic structure is also illustrated and indicated at 94. The structure 94 represents how a portion of the trailer 54' may be represented in the depth map 76 if captured by the camera system 44.

Once a occupancy grids 88 are generated as indicated at 68, the two occupancy grids can be fused into a single map that can be utilized for a path planning system schematically indicated at 72. The fusion of the two occupancy grids, as indicated at 70 in FIG. 3, includes combining occupancy grid of the image point cloud map 98 and the radar point cloud map 82. The occupancy grids 88 of the point cloud maps 82, 98 are utilized to filter objects from the completed map.

Accordingly, the comparison in fusing the two occupancy grids provides for the identification of features that have a velocity above a predefined target value that is indicative of a dynamically moving object. As is shown in FIG. 8, the dynamic object 94 is indicated in both occupancy grids. The point cloud occupancy grid will define velocities of this object that are above a predefined level and enable filtering out of such dynamic objects such so that the completed fused map does not include the dynamic objects and is more indicative of the environment through which the desired path 50 is formed.

Figure 9:
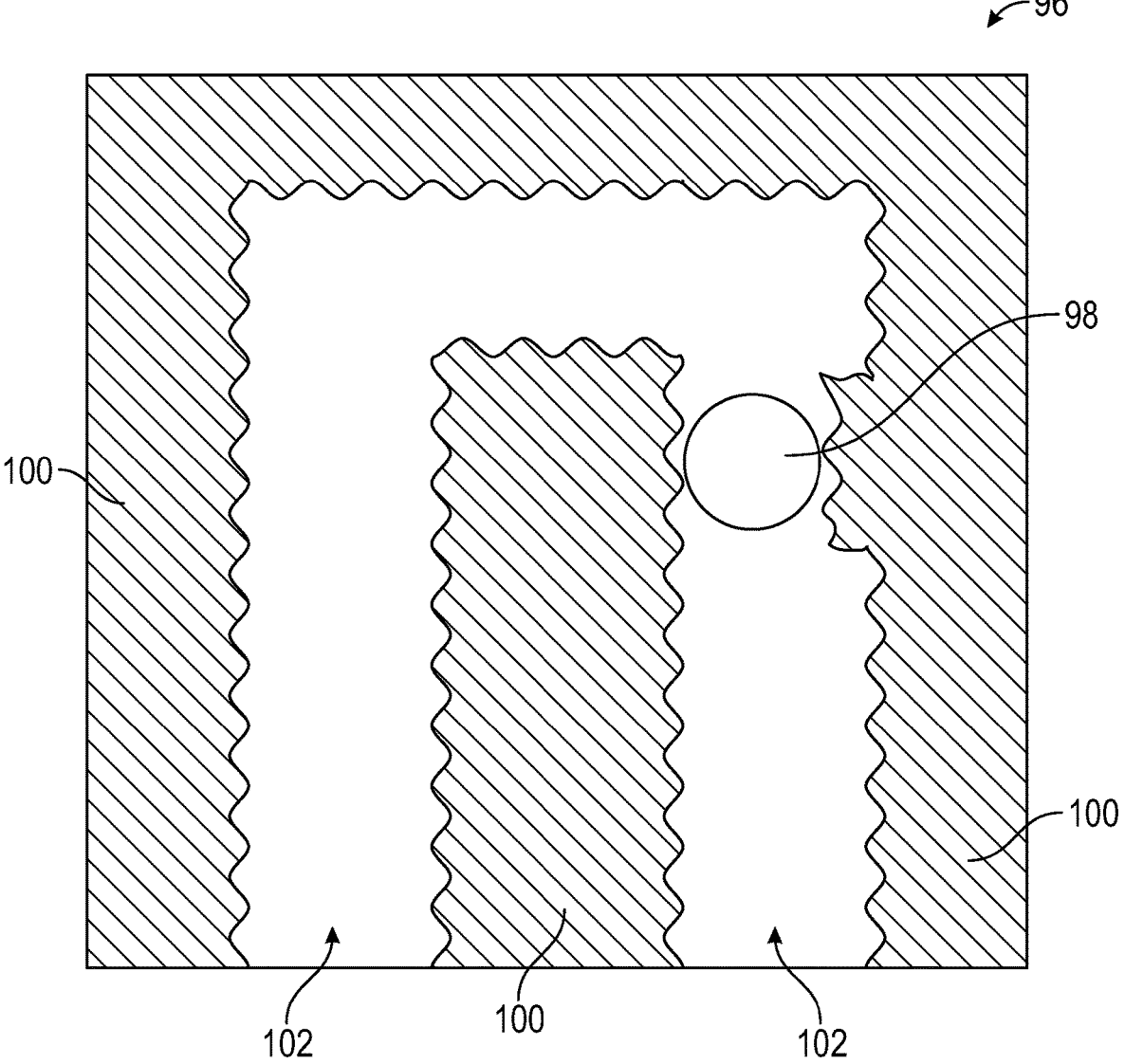
FIG. 9 is a schematic view of an example two-dimensional map generated by fusing occupancy grids of an image point cloud map and a radar point cloud map.

Referring to FIG. 9, with continued reference to the other figures, a fused output map 90 is schematically shown at 96 and includes an open space 98 where the previous object 94 was shown in the occupancy grids indicated in FIG. 8. In this completed fused map 96, static features are indicated at 100 and open spaces indicated at 102. The dynamic features have been identified utilizing the velocity sensed and depicted in the point cloud map in order to enable identification and filtering out of those dynamic objects. The completed fused output map 90 is then available and communicated to the vehicle navigation system 34 for use in defining the path 50 and moving the vehicle 22.

Accordingly, the example system provides for the identification and removal of dynamic objects from a feature map utilized to plan a path for an autonomous or semi-autonomous vehicle.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of creating a map of an environment surrounding a vehicle comprising:

obtaining, by a controller processor, information indicative of vehicle movement from at least one vehicle system, wherein the vehicle system comprises at least one of a wheel speed sensor, an acceleration sensor, an inertial measurement unit or a global positioning system;

obtaining, by the controller processor, images including objects within the environment surrounding the vehicle from a mono-camera mounted on the vehicle;

determining a pose of the mono-camera in a local reference frame;

creating, by the controller processor, a depth map of the environment surrounding the vehicle based on images obtained from the mono-camera, the pose of the mono-camera, and the information indicative of vehicle movement, the depth map associating a distance to the vehicle for each pixel in the images;

creating, by the controller processor, an image point cloud map of the environment surrounding the moving vehicle based on the depth map and based on the images obtained from the mono-camera mounted to the moving vehicle;

creating, by the controller processor, a radar point cloud map of object velocities with information from a radar sensor mounted on the vehicle and the information indicative of vehicle movement, wherein the radar point cloud map includes a plurality of points that are indicative of a relative velocity between the moving vehicle and the objects around the moving vehicle;

creating, by the controller processor, a first occupancy grid of the image point cloud map, and creating a second occupancy grid of the radar point cloud map;

creating, by the controller processor, a fused map by combining the first occupancy grid with the second occupancy grid and removing any dynamic objects from the fused map;

at least one of using, by the controller processor or another processor in the vehicle, the fused map for navigating the vehicle autonomously or semi-autono-
mously, or communicating, by the controller processor,
the fused map to a vehicle driving control system of the
vehicle for autonomously or semi-autonomously con-
trolling the vehicle.

2. The method as recited in claim 1, further comprising
identifying, by the controller processor, an object as a
dynamic object in response to a cluster of points within the
radar point cloud map having a velocity that indicates
movement relative to static features within the environment.

3. The method as recited in claim 1, further comprising
using, by the controller processor, the pose of the mono-
camera in the creation of at least one of the image point
cloud map or the radar point cloud map.

4. The method as recited in claim 1, wherein the depth
map includes points that are indicative of a distance between
the vehicle and objects surrounding the vehicle.

5. The method as recited in claim 1, wherein the object
velocities comprise a Doppler velocity.

6. The method as recited in claim 1, wherein the infor-
mation indicative of vehicle movement is generated with a
vehicle dynamic model.

7. The method as recited in claim 1, wherein the image
point cloud map and the radar point cloud map are each in
three dimensions, and wherein the occupancy grid of the
image point cloud map and the occupancy grid of the radar
point cloud map are each in two dimensions.

8. An autonomous vehicle system for creating a map of
static objects within an environment surrounding the autono-
mous vehicle, the system comprising:
  a controller processor configured to:
    obtain information indicative of vehicle movement
      from vehicle navigation system comprising at least
      one of a wheel speed sensor, an acceleration sensor,
      an inertial measurement unit or a global positioning
      system;
    obtain images of objects within the environment sur-
      rounding vehicle from a mono-camera mounted on
      the vehicle;
    determine a pose of the mono-camera in a local refer-
      ence frame;
    create a depth map of the environment surrounding the
      vehicle based on images obtained from the mono-
      camera, the pose of the mono-camera and the infor-
      mation indicative of vehicle movement, the depth
      map associating a distance to the vehicle for each
      pixel in the images;
    create an image point cloud map of the environment
      surrounding the moving vehicle based on the depth
      map and based on the images obtained from the
      mono-camera mounted to the moving vehicle;
    create a radar point cloud map of object velocities with
      information from a radar sensor mounted on the
      vehicle and the information indicative of vehicle
      movement, wherein the radar point cloud map
      includes a plurality of points that are indicative of a
      relative velocity between the moving vehicle and the
      objects around the moving vehicle;
    create a fused map by combining the occupancy grid of
      the image point cloud map with the occupancy grid
      of the radar point cloud map, and remove any
      dynamic objects; and
    at least one of use the fused map to provide navigation
      for the vehicle or communicate the fused map to a
      vehicle driving control system of the vehicle for
      autonomously or semi-autonomously controlling the
      vehicle.

9. The autonomous vehicle system as recited in claim 8,
wherein the controller processor is further configured to
identify an object as a dynamic object in response to a
cluster of points within the radar point cloud map having a
velocity that indicates movement relative to static features
within the environment.

10. The autonomous vehicle system as recited in claim 8,
including a data storage medium that includes instructions
executable by the controller processor.

11. A non-transitory computer readable medium compris-
ing stored instructions executable by a controller processor
for creating a map of an environment surrounding a vehicle,
the instructions comprising:
  instructions prompting a controller processor to obtain
    images including objects within the environment sur-
    rounding the vehicle from a mono-camera mounted on
    the vehicle;
  instructions prompting a controller processor to determine
    a pose of the mono-camera in a local reference frame;
  instructions prompting a controller processor to create a
    depth map of the environment surrounding the vehicle
    based on the images obtained from the mono-camera,
    on information indicative of the vehicle movement
    from a navigation system of the vehicle comprising at
    least one of a wheel speed sensor, an acceleration
    sensor, a inertial measurement unit or a global posi-
    tioning system, and on the pose of the mono-camera,
    the depth map associating a distance to the vehicle for
    each pixel in the images;
  instructions prompting a controller processor to create an
    image point cloud map of the environment surrounding
    the moving vehicle based on the depth map and based
    on the images obtained from the mono-camera
    mounted to the moving vehicle;
  instructions prompting the controller processor to create a
    radar point cloud map of object velocities with infor-
    mation from a radar sensor and the information indica-
    tive of vehicle movement, wherein the radar point
    cloud map includes a plurality of points that are indica-
    tive of a relative velocity between the moving vehicle
    and the objects around the moving vehicle;
  instructions prompting the controller processor to create
    an occupancy grid of the image point cloud map, and
    create an occupancy grid of the radar point cloud map;
  instructions prompting the controller processor to create a
    fused map by combining the occupancy grid of the
    image point cloud map with the occupancy grid of the
    radar point cloud map, and to remove any dynamic
    objects from the fused map; and
  instructions prompting the controller processor to at least
    one of use the fused map to provide navigation for the
    vehicle or communicate the fused map to a vehicle
    driving control system of the vehicle for autonomously
    or semi-autonomously controlling the vehicle.

12. The non-transitory computer readable medium as
recited in claim 11, further including instructions for
prompting the controller processor to identify an object as a
dynamic object in response to a cluster of points within the
radar point cloud map having a velocity that indicates
movement relative to static features within the environment.

13. The non-transitory computer readable medium as
recited in claim 11, wherein the non-transitory computer
readable medium comprises at least one of a volatile
memory or nonvolatile memory.

14. The non-transitory computer readable medium as
recited in claim 11, wherein the image point cloud map and
the radar point cloud map are each in three dimensions, and wherein the occupancy grid of the image point cloud map and the occupancy grid of the radar point cloud map are each in two dimensions.

* * * * *